United States Patent [19]

Sakano et al.

[11] 4,271,230

[45] Jun. 2, 1981

[54] FOAMED URETHANE COMPOSITE

[75] Inventors: Hajime Sakano, Hirakata; Fumio Nakai, Shiga; Yukio Tomari, Toyonaka, all of Japan

[73] Assignee: Sumitomo Naugatuck Co., Ltd., Japan

[21] Appl. No.: 67,631

[22] Filed: Aug. 17, 1979

[30] Foreign Application Priority Data

Aug. 17, 1978 [JP] Japan ............................. 53-100717
Aug. 17, 1978 [JP] Japan ............................. 53-100718

[51] Int. Cl.$^3$ .............................................. B32B 5/18
[52] U.S. Cl. .................................. 428/315; 427/372.2; 427/407.1
[58] Field of Search ............... 428/315; 427/331, 333, 427/337, 340, 372 R, 407 R

[56] References Cited

U.S. PATENT DOCUMENTS

| | | | |
|---|---|---|---|
| 2,976,577 | 3/1961 | Gould | 428/315 |
| 3,873,407 | 3/1975 | Kumata et al. | 428/315 |
| 3,873,654 | 3/1975 | Smith | 428/159 |

Primary Examiner—William J. Van Balen
Attorney, Agent, or Firm—Jones, Tullar & Cooper

[57] ABSTRACT

A foamed urethane composites comprising foaming urethane and a covering material and having excellent in thermal aging-resistance, which is obtained by applying to the covering material surface to be contacted with the foamed urethane (A) an organic solvent solution or aqueous emulsion comprising (A-1) at least one of flexible urethane resins, starting materials for preparation of flexible urethane resins and vinyl chloride resins, further applying thereto (B) an organic solvent solution comprising (B-1) a copolymer of a carboxyl group-containing ethylenically unsaturated monomer(s) with an acrylic and/or methacrylic acid ester(s) and (B-2) at least one of blocked isocyanate compounds, poly-N-alkoxymethylmelamine compounds, polyepoxy compounds, polyoxazoline compounds, polydihydrooxazine compounds and reactive polyamide compounds, and then subjecting the coated product to crosslinking under heating.

3 Claims, No Drawings

FOAMED URETHANE COMPOSITE

The present invention relates to a foamed urethane composite having excellent thermal aging-resistance properties.

Inner equipment of motorcars and airplanes, for instance, crash pads and armrests, is made from foamed urethane composites having as a covering material a soft or semi-hard thermoplastic resin sheet for assurance of safety and comfort to human bodies.

In such foamed urethane composites, especially for crash pads which are used at high temperature and exposed to direct sunlight, the covering material is readily aged by heat to cause hardening and cracking, whereby assurance of the safety and comfort to be expected by the use of the foamed urethane composite is not attained sufficiently, and the appearance is also deteriorated.

For the purpose of overcoming these drawbacks and in order to provide foamed urethane composites having excellent thermal aging-resistance, an extensive study has been made. As the result, there is now provided a foamed urethane composite comprising foamed urethane and a covering material which has excellent thermal aging-resistance properties, which is obtainable by applying to the surface of the covering material to be contacted with the foamed urethane (A) an organic solvent solution or aqueous emulsion comprising at least one member selected from the group consisting of flexible urethane resins, starting materials for preparation of flexible urethane resins and vinyl chloride resins, further applying thereto (B) an organic chloride resins, further applying thereto (B) an organic solvent solution comprising (B-1) a copolymer of a carboxyl group-containing ethylenically unsaturated monomer with an acrylic and/or methacrylic acid ester(s) and (B-2) at least one member selected from the group consisting of blocked isocyanate compounds, poly-N-alkoxymethylmelamine compounds, polyepoxy compounds, polyoxazoline compounds, polydihydrooxazine compounds and reactive polyamide compounds, and then subjecting the coated product to crosslinking under heating.

In the present invention, the surface of the covering material to be contacted with the foamed urethane is first treated with an organic solvent solution or aqueous emulsion comprising at least one member of the group consisting of flexible urethane resins, starting materials for synthesis of flexible urethane resins and vinyl chloride resins (hereinafter referred to as "solution A"). The solution A additionally may contain a copolymer of at least one ethylenically unsaturated monomer with an aminoalkyl acrylate compound of the formula:

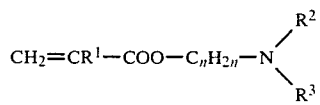

wherein $R^1$ is hydrogen or methyl, $R^2$ and $R^3$ are each hydrogen or $C_1$-$C_4$ alkyl and n is an integer of 1 to 4. The surface is next contacted with an organic solvent solution containing (B-1) a copolymer of a carboxyl group-containing ethylenically unsaturated monomer with an acrylic and/or methacrylic acid ester(s) and (B-2) at least one member selected from the group consisting of blocked isocyanate compounds, poly-N-alkoxymethylmelamine compounds, polyepoxy compounds, polyoxazoline compounds, polydihydrooxazine compounds and reactive polyamide compounds (hereinafter referred to as "solution B"). The thus coated surface is then subjected to heating for crosslinking.

The solution B comprises as the essential components the copolymer (B-1) and the compound (B-2). With the copolymer (B-1) alone, control of the strength and the solvent-resistance of the coating film is difficult, even in combination with the solution A, and the resultant improvement of thermal aging-resistance properties is not expected produced. With the use of the compound (B-2) alone, crosslinking is effected at the compound (B-2) itself or with the components of the solution A, so that the sufficient effect of improvement of the thermal aging-resistance properties is not obtained. Thus, in the solution B, the copolymer (B-1) is a main ingredient and the compound (B-2) is an auxiliary agent for crosslinking of the copolymer (B-1).

In the present invention, it is necessary that the covering material coated with the solution A be further contacted with solution B. With application of the solution A alone, the improvement of the thermal aging-resistance properties of the covering material and the composite is insufficient. By further application of the solution B, excellent thermal aging-resistance properties as well as weather-resistance properties can be obtained.

Upon application of the solution B alone, the adhesion between the covering material and the coating film is insufficient, and, after introduction of urethane and its foaming, separation of the covering material and the foamed urethane layer takes place, which is undesirable for practical use.

When the solution B is first applied prior to the application of the solution A, preparation of composite having excellent thermal resistance properties is not attained.

Explaining each of the components in the solutions A and B, the "flexible urethane resin" may be prepared by the reaction between an active hydrogen-containing compound having at least two active hydrogen-containing groups such as hydroxyl, carboxyl and amino groups and an isocyanate compound such as diisocyanate, adduct of diisocyanate, low polymer of diisocyanate, urethane prepolymer or blocked isocyanate.

The "starting materials for preparation of flexible urethane resins" are both active hydrogen-containing compounds and isocyanate compounds which are converted into flexible urethane resins by heating or by the action of a catalyst.

Examples of the active hydrogen-containing compound are water, ethylene glycol, propylene glycol, polyoxyalkylene polyol, polytetramethylene ether glycol, condensed polyester, lactone polyester, acryl polyol, castor oil, polybutadiene oligomer having a hydroxyl group at the terminal position, and the like.

Examples of the isocyanate compound are aromatic diisocyanates (e.g. 4,4'-diphenylmethane diisocyanate, tolylene diisocyanate, xylylene diisocyanate), aliphatic diisocyanates (e.g. hexamethylene diisocyanate), adducts of said diisocyanates, low polymeric prepolymers, blocked isocyanates, and the like.

The "vinyl chloride resin" is exemplified by polyvinyl chloride, vinyl chloride copolymers (e.g. vinyl acetate-vinyl chloride copolymer, ethylene-vinyl acetate-vinyl chloride copolymer, acrylic acid ester-vinyl chloride copolymer, propylene-vinyl chloride copolymer) or their mixtures.

The "ethylenically unsaturated monomer" are exemplified by vinyl esters of $C_2$–$C_6$ saturated carboxylic acids (e.g. vinyl acetate, vinyl propionate), vinyl benzoate, acrylic and methacrylic acid esters of $C_1$–$C_8$ saturated alcohols (e.g. methyl acrylate, ethyl acrylate, propyl acrylate, isopropyl acrylate, butyl acrylate, isobutyl acrylate, 2-ethylhexyl acrylate, cyclohexyl acrylate, dodecyl acrylate, octadecyl acrylate, methyl methacrylate, ethyl methacrylate, propyl methacrylate, isopropyl methacrylate, butyl methacrylate, isobutyl methacrylate, 2-ethylhexyl methacrylate, cyclohexyl methacrylate, dodecyl methacrylate, octadecyl methacrylate), maleic anhydride, maleic acid monoesters and diesters of $C_1$–$C_{18}$ saturated alcohols (e.g. monomethyl maleate, monoethyl maleate, monobutyl maleate, monocyclohexyl maleate, mono(2-ethylhexyl) maleate, monododecyl maleate, monooctadecyl maleate, dimethyl maleate, diethyl maleate, dibutyl maleate, dicyclohexyl maleate, di(2-ethylhexyl) maleate, didodecyl maleate, dioctadecyl maleate), vinyl ethers (e.g. vinyl methyl ether, vinyl ethyl ether), N-vinyllactams (e.g. N-vinylpyrrolidone, N-vinylcaprolactam), acrylamide compounds, secondary vinyl carboxylic acid amides, N-vinyl-N-alkylcarboxylic acid amides, and the like. Among them, particularly preferred are vinyl esters, acrylic acid esters and methacrylic acid esters, which have 2 to 6 carbon atoms.

Examples of the "aminoalkyl acrylate compounds" are aminomethyl acrylate, aminoethyl acrylate, amino-n-butyl acrylate, N-methylaminoethyl acrylate, N-ethylaminoethyl acrylate, N-ethylaminoisobutyl acrylate, N-t-butylaminoethyl acrylate, N,N-dimethylaminoethyl acrylate, N,N-dimethylaminoisopropyl acrylate, N,N-dimethylamino-n-butyl acrylate, N-methyl-N-ethyl acrylate, N,N-diethylaminoethyl acrylate, N,N-diisopropylaminoethyl acrylate, N,N-di-n-propylamino-n-propyl acrylate, N,N-di-n-propylaminoethyl acrylate, N,N-di-n-butylamino-n-propyl acrylate, aminomethyl methacrylate, aminoethyl methacrylate, amino-n-butyl methacrylate, N-methylaminoethyl methacrylate, N-ethylaminoethyl methacrylate, N-ethylaminoisobutyl methacrylate, N-t-butylaminoethyl methacrylate, N,N-dimethylaminoethyl methacrylate, N,N-dimethylaminoisopropyl methacrylate, N,N-dimethylamino-n-butyl methacrylate, N-methyl-N-ethyl methacrylate, N,N-diethylaminoethyl methacrylate, N,N-diisopropylaminoethyl methacrylate, N,N-di-n-propylamino-n-propyl methacrylate, N,N-di-n-propylaminoethyl methacrylate, N,N-di-n-butylamino-n-propyl methacrylate, and the like.

The solution A may be used in the form of aqueous emulsion or organic solvent solution. Examples of the organic solvent are aromatic hydrocarbons (e.g. benzene, toluene, xylene, cymene, cumene, diethylbenzene, ethylbenzene, durene), ketones (e.g. methylethylketone, methylisobutylketone, acetone, cyclohexanone), esters (e.g. ethyl acetate, butyl acetate), ethers (e.g. tetrahydrofuran, dioxane, diethyl ether), amide compounds (e.g. dimethylformamide, dimethylacetamide), nitro compounds (e.g. nitrobenzene, nitrotoluene), and the like.

The essential component in the solution A is the flexible urethane resin, the starting material for preparation of the flexible urethane resin or the vinyl chloride resin, which will be hereinafter referred to as "component (A-1)". When the copolymer of at least one ethylenically unsaturated monomer with the aminoalkyl acrylate compound, which will be hereinafter referred to as "component (A-2)", is additionally employed in the solution A, the weight proportion of the components (A-1) and (A-2) may be preferably from 300:100 to 1000:100, although this range is not limitative.

The amount of the solution A to be applied is not limitative but is preferred to range from 4 to 200 g (in terms of the solid components contained in the solution A) per 1 $m^2$.

The ethylenically unsaturated monomer having a carboxyl group which is a constituent of the copolymer (B-1) may be, for instance, acrylic acid, methacrylic acid, itaconic acid, fumaric acid, maleic acid or its half ester or crotonic acid. Examples of the acrylic or methacrylic ester which is another constituent of the copolymer (B-1) are methyl acrylate, ethyl acrylate, propyl acrylate, isopropyl acrylate, n-propyl acrylate, n-butyl acrylate, n-hexyl acrylate, n-octyl acrylate, 2-ethylhexyl acrylate, chloromethyl acrylate, chloroethyl acrylate, 2-hydroxyethyl acrylate, ethylene diacrylate, methyl methacrylate, ethyl methacrylate, isopropyl methacrylate, n-propyl methacrylate, n-butyl methacrylate, n-hexyl methacrylate, n-octyl methacrylate, chloromethyl methacrylate, chloroethyl methacrylate, glycidyl methacrylate, and the like. The weight proportion of the ethylenically unsaturated monomer having a carboxyl group and the acrylic acid or methacrylic ester in the copolymer (B-1) is not limitative but is preferred to be from 10:90 to 90:10, preferably from 20:80 to 80:20. In addition to the aforementioned constituents, the copolymer (B-1) may contain any other suitable copolymerizable monomer in an amount of not more than 20 mol %. Examples of suitable copolymerizable monomers are acrylamide, methylolated acrylamide, methacrylamide, methylolated methacrylamide, acrylonitrile, methacrylonitrile, styrene, vinyl chloride, vinyl acetate, butadiene, isoprene, and the like. The copolymer (B-1) has an intrinsic viscosity usually of 0.02 to 10 dl/g, preferably of 0.1 to 2 dl/g, although this is not limitative.

Illustrative examples of the "blocked isocyanate compound", which are usable as the component (B-2), include isocyanate compounds such as toluene diisocyanate and diisocyanatodiphenylmethane wherein the isocyanato group is blocked with phenol, caprolactam, malonic diester, hydrogen cyanide, diphenylamine, succinimide or acetoacetate, and prepolymers formed from them and polyols or polyamines. Examples of the "poly-N-alkoxymethylmelamine compound" are hexamethylolmelamine hexamethyl ether, pentamethylolmelamine trimethyl ether, tetramethylolmelamine tetramethyl ether, trimethylolmelamine dimethyl ether, hexamethylolmelamine hexaethyl ether, hexamethylolmelamine hexabutyl ether, and the like. Examples of the "polyepoxy compound" are bisphenol A diglycidyl ether, butadiene dioxide, bisphenol A epichlorohydrin, and epoxyprepolymers obtained from these compounds and various polyols. Examples of the "polyoxazoline compound" are 2,2'-tetramethylene-(4,4-dimethyl-2-oxazoline), 2,2'-hexamethylene-(4,4-dimethyl-2-oxazoline), 2,2'-phenylene-(4,4-dimethyl-2-oxazoline), and the like. Examples of the "polydihydrooxazine compound" are 5,6-dihydro-4H-1,3-oxazine, 1,3- and 1,4-bis(5',5'-dimethyl-5',6'-dihydro-4'H-1',3'-oxazine-2'-yl)benzene, 1,3- and 1,4-bis(6'-methyl-5',5'-dihydro-4'H-1',3'-oxazine-2'-yl)benzene, and the like. The "reactive polyamide compound" may be any compound prepared by substituting the hydrogen atom of the amide group of nylon with any other substituent such as a methylol group or an alkoxyl group. Its specific example is N-alkoxymethylated nylon. As the component (B-2), a mixture of the polyepoxy compound and the reactive polyamide is particularly preferred.

The organic solvent to be used for preparation of the solution B in the form of organic solvent solution is not particularly limited in that any suitable organic solvent as mentioned above in the preparation of the solution A may be employed. The organic solvents used in the solutions A and B may be the same as or different from each other.

The weight proportion of the copolymer (B-1) and the compound (B-2) in the solution B is not particularly limited to, but is preferably from 1:1 to 1:0.1.

For enhancing the softness of the coating film due to the solution B, a polyol compound (e.g. ethylene glycol, propylene glycol, diethylene glycol, 1,3-propanediol, 1,4-butanediol, 1,5-pentanediol, glycerol trimethylolethane, trimethylolpropane, hexanetriol, polyvinyl alcohol), a phosphorus plasticizer and/or a polyester plasticizer may be incorporated into the solution B.

The amount of the solution B to be applied is not particularly limited and may be from 3 to 7 g (in terms of the solid components)/1 m$^2$.

The application of the solutions A and B to the covering material may be effected by any suitable procedure such as coating by the aid of a roll coater, a gravure coater or a knife coater or spraying by the aid of an air gun, or an airless gun.

Drying after the application may be effected at room temperature. It is preferred to effect drying at 100° C. for 1 minute after the application of the solution A and then to effect crosslinking under heating at 100° to 120° C. for 2 minutes after the application of the solution B.

The covering material as a component of the foamed urethane composite of the invention is a sheet which can able to be shaped by heat. Depending on the use of the final product, various kinds of sheets may be employed. Illustrative examples include vinyl chloride resin sheets which may additionally contain a modifier (e.g. ABS resin (acrylonitrile-butadiene-styrene copolymer) or SAN resin (styreneacrylonitrile copolymer)), ABS resin sheets, polyolefin sheets and rubber-like polymer (e.g. NBR (acrylonitrilebutadiene rubber)) sheets. These sheets may be soft, semi-hard or hard. They may be also foamed or not. In case of the rubber-like polymer such as NBR, a crosslinked structure may be partially obtained. When the final product is crash pad or armrest, the use of a soft or semihard sheet is desirable.

The preparation of the foamed urethane composite of the invention may be effected by any appropriate procedure, without particular limitation, provided that the coating films of the solutions A and B are formed between the foamed urethane and the covering material (i.e. covering material/coating film of solution A/coating film of solution B/foaming urethane). Typical examples of the preparation procedures are as follows:

(a) Shaping of the covering material in vacuo, application of the solutions A and B and introduction of urethane and its foaming;

(b) Application of the solution A alone to the covering material, shaping in vacuo, application of the solution B and introduction of urethane and its foaming;

(c) Application of the solutions A and B to the covering material, shaping in vacuo and introduction of urethane and its foaming;

(d) Application of the solutions A and B to the covering material, incorporation of foamed urethane into the covering material, and thermal shaping to obtain a composite having a desired form.

The present invention will be explained further in detail by the following Examples which are not intended to limit the scope of the invention. In these Examples, part(s) and % are by weight.

EXAMPLE 1

The solution A containing the flexible urethane resin or the vinyl chloride resin as shown in Table 1 is applied to a soft vinyl chloride resin sheet containing ABS resin and a plasticizer (crash pad sheet) to form a coating film of the solution A. Then, the solution B as shown in Table 1 is further applied thereto, and crosslinking under heating is effected to form a coating film of the solution B. The resultant sheet (20 cm×20 cm) is placed into a frame for shaping, and urethane is introduced therein. The thus obtained foamed urethane composite is subjected to the thermal aging-resistance test and the weather-resistance test. The results are shown in Tables 2 and 3.

The adherence between the foamed urethane and the covering material is determined as follows:

The covering material is peeled off from the obtained foamed urethane composite, and the amount of the foamed urethane adhering to the surface of the covering material is macroscopically observed to make estimation into 1st (amount of foamed urethane, large) to 5th (amount of foamed urethane, none) grades.

TABLE 1

| | Run No. | 1 | 2 | 3 | 4 | 5 | 6 | 7 | 8 | 9 | 10 |
|---|---|---|---|---|---|---|---|---|---|---|---|
| Solution A | Flexible urethane resin | | | | | | | | | | |
| (amount | Organic solvent solution*1 | 10 | — | 8 | 8 | — | 10 | — | 8 | 10 | — |
| applied | Aqueous emulsion*2 | — | 10 | — | — | — | — | — | — | — | — |
| (solid | Vinyl chloride resin | | | | | | | | | | |
| components), | Organic solvent solution*3 | — | — | — | — | 10 | — | — | — | — | — |
| g/m$^2$) | | | | | | | | | | | |
| Solution B | B-1 Copolymer | | | | | | | | | | |
| (amount | MAA-BA*4 | 4 | 3 | — | — | — | 4 | 4 | — | — | — |
| applied | AA-MMA*5 | — | — | 4 | 4 | — | — | — | — | — | — |
| (solid | MAA-EA*6 | — | — | — | — | 4 | — | — | — | 4 | — |
| components), | B-2 Compound | | | | | | | | | | |
| g/m$^2$) | ε-Caprolactam blocked TDI | 1 | 2 | — | — | 1 | — | — | — | — | — |
| | Diglycidyl ether | — | — | 1 | — | — | — | 1 | — | — | — |
| | N-Methoxymethylated nylon | — | — | — | 1 | — | 0.7 | — | — | — | — |

TABLE 1-continued

| Run No. | 1 | 2 | 3 | 4 | 5 | 6 | 7 | 8 | 9 | 10 |
|---|---|---|---|---|---|---|---|---|---|---|
| Bisphenol A diglycidyl ether | — | — | — | — | — | 0.3 | — | — | — | — |

Note:
*¹"Nipporan 5104" (manufactured by Nippon Polyurethane Co., Ltd.) is diluted with methylethylketone to obtain a solid content of 20%.
*²Aqueous urethane emulsion. "Bondick 1050" (manufactured by Dainippon Ink and Chemicals, Inc.).
*³A mixture of "Sumilit MXC-7" (manufactured by Sumitomo Chemical Co., Ltd.) and dioctyl phthalate in a weight proportion of 12.5:7.5 is diluted with methylethylketone to obtain a solid content of 20%.
*⁴Copolymer of methacrylic acid and butyl acrylate in a weight proportion of 40:60 (intrinsic viscosity, 0.6).
*⁵Copolymer of acrylic acid and methyl methacrylate in a weight proportion of 40:60 (intrinsic viscosity, 0.7).
*⁶Copolymer of methacrylic acid and ethyl acrylate in a weight proportion of 40:60 (intrinsic viscosity, 0.6).
The solution B is diluted with methylethylketone to obtain a solid content of 20%.

TABLE (Thermal aging-resistance)

| Run No. | 1 | 2 | 3 | 4 | 5 | 6 | 7 | 8 | 9 | 10 |
|---|---|---|---|---|---|---|---|---|---|---|
| Elongation of covering material after thermal aging (%) | | | | | | | | | | |
| 110° C., 400 hours | 170 | 165 | 160 | 165 | 160 | 190 | 40 | <15 | <15 | <10 |
| 120° C., 400 hours | 105 | 100 | 100 | 105 | 100 | 130 | 30 | <10 | <10 | <10 |
| Adherence between foamed urethane and covering material after thermal aging | | | | | | | | | | |
| 1st to 5th grade | 2 | 2 | 2 | 2 | 3 | 2 | 5 | 3 | 3 | 4 |
| Bending of foamed urethane composite after thermal aging (110° C., 400 hours) | | | | | | | | | | |
| o - not broken; x - broken | o | o | o | o | o | o | x | x | x | x |

TABLE 3

(Weather-resistance)

| Run No. | 4 | 5 | 6 | 10 |
|---|---|---|---|---|
| Elongation of covering material after irradiation by the aid of Sunshine weather-O-meter (%) (Black panel temperature, 83° C.) | | | | |
| 300 hours | 45 | 39 | 55 | 8 |
| 400 hours | 33 | 30 | 40 | 0 |

EXAMPLE 2

The solution A (organic solvent solution) as shown in Table 4 is applied to the soft vinyl chloride resin sheet as used in Example 1 to form a coating film of the solution A. Then, the solution B (organic solvent solution) as shown in Table 4 is further applied thereto, and thermal crosslinking is effected to form a coating film of the solution B. Using the resultant sheet, a foamed urethane composite is prepared as in Example 1, and the thermal aging-resistance test and the weather-resistance test are effected. In addition, the state of adherence of the foamed urethane composite is estimated in a thermally unaged condition (1st to 5th grades). The results are shown in Tables 5, 6 and 7.

TABLE 4

| | Run No. | 11 | 12 | 13 | 14 | 15 | 16 | 17 | 18 | 19 | 20 | 21 |
|---|---|---|---|---|---|---|---|---|---|---|---|---|
| Solution A (amount applied (solid components), g/m²) | Flexible urethane resin*¹ | 12 | 12 | — | — | — | 12 | 12 | — | 12 | — | |
| | Vinyl chloride resin*² | — | — | 12 | 12 | 12 | — | — | — | — | — | |
| | A-1 Copolymer | | | | | | | | | | | |
| | Methylmethacrylate-N,N-dimethylaminoethyl-methacrylate*³ | 3 | 3 | 3 | — | — | 3 | 3 | 3 | — | 3 | — |
| | Ethylacrylate-N,N-dimethylaminoethyl-methacrylate*⁴ | — | — | — | 3 | — | — | — | — | — | — | |
| Solution B (amount applied (solid components), g/m²) | B-1 Copolymer | | | | | | | | | | | |
| | MMA-BA*⁵ | 4 | — | — | 4 | — | — | — | — | — | — | |
| | AA-MMA*⁶ | — | 4 | 4 | — | — | — | — | — | — | — | |
| | AA-BA*⁷ | — | — | — | — | 4 | — | — | 4 | — | — | |
| | MAA-EA*⁸ | — | — | — | — | — | 4 | — | — | — | — | |
| | MAA-AA-BA*⁹ | — | — | — | — | — | — | — | — | 4 | — | — |
| | B-2 Compound | | | | | | | | | | | |
| | ε-Caprolactam blocked TDI | 2 | — | — | 2 | — | — | — | — | — | — | |
| | Diglycidyl ether | — | 2 | — | — | — | — | — | — | — | — | |
| | N-Methoxymethylated nylon | — | — | 2 | — | 2 | — | — | — | — | — | |

TABLE 4-continued

| Run No. | 11 | 12 | 13 | 14 | 15 | 16 | 17 | 18 | 19 | 20 | 21 |
|---|---|---|---|---|---|---|---|---|---|---|---|
| Bisphenol A diglycidyl ether | — | — | — | — | — | 2 | 2 | — | 2 | — | — |

Note:
*[1]"Nipporon 5104" (manufactured by Nippon Polyurethane Co., Ltd.) is diluted with methylethylketone to obtain a solid content of 20%.
*[2]A mixture of "Sumilit MCX-7" (manufactured by Sumitomo Chemical Co., Ltd.) and dioctyl phthalate in a weight proportion of 12.5:7.5 is diluted with methylethylketone to obtain a solid content of 20%.
*[3]Copolymer of methyl methacrylate and N,N-dimethylaminoethyl methacrylate in a weight proportion of 70:30.
*[4]Copolymer of ethyl acrylate and N,N-dimethylaminoethyl methacrylate in a weight proportion of 70:30.
*[5]Copolymer of methacrylic acid and butyl acrylate in a weight proportion of 40:60 (intrinsic viscosity, 0.6).
*[6]Copolymer of acrylic acid and methyl methacrylate in a weight proportion of 40:60 (intrinsic viscosity, 0.7).
*[7]Copolymer of acrylic acid and butyl acrylate in a weight proportion of 40:60 (intrinsic viscosity, 0.7).
*[8]Copolymer of methacrylic acid and ethyl acrylate in a weight proportion of 40:60 (intrinsic viscosity, 0.6).
*[9]Copolymer of methacrylic acid, acrylic acid and butyl acrylate in a weight proportion of 10:30:60 (intrinsic viscosity, 0.7).
The solution B is diluted with methylethylketone to obtain a solid content of 20%.

TABLE 5

| | (Thermal aging-resistance) | | | | | | | | | | |
|---|---|---|---|---|---|---|---|---|---|---|---|
| Run No. | 11 | 12 | 13 | 14 | 15 | 16 | 17 | 18 | 19 | 20 | 21 |
| Elongation of covering material after thermal aging (%) | | | | | | | | | | | |
| 100° C. 600 hours | 155 | 150 | 150 | 150 | 130 | 45 | 15 | <10 | 40 | <10 | <10 |
| 125° C. 350 hours | 80 | 90 | 90 | 90 | 70 | 30 | <10 | <10 | 20 | <10 | <10 |
| Adherence between foamed urethane and covering material after thermal aging | | | | | | | | | | | |
| 1st to 5th grade | 1 | 1 | 1 | 1 | 3 | 2 | 2 | 3 | 5 | 1 | 4 |
| Bending of foaming urethane composite after thermal aging (100° C. 400 hours) | | | | | | | | | | | |
| o - not broken; x - broken | o | o | o | o | o | x | x | x | x | x | x |

TABLE 6

| | (Weather-resistance) | | |
|---|---|---|---|
| Run No. | 11 | 13 | 21 |
| Elongation of covering material after irradiation by the aid of Sunshine weather-O-meter (%) (Black panel temperature, 85° C.) | | | |
| 300 hours | 45 | 42 | 5 |
| 400 hours | 35 | 30 | 0 |

TABLE 7

| | (Adherence before thermal aging) | | | | | | | | | | |
|---|---|---|---|---|---|---|---|---|---|---|---|
| Run No. | 11 | 12 | 13 | 14 | 15 | 16 | 17 | 18 | 19 | 20 | 21 |
| Adherence between foaming urethane and covering material | | | | | | | | | | | |
| 1st to 5th grade | 1 | 1 | 1 | 1 | 3 | 1 | 3 | 4 | 5 | 2 | 4 |

EXAMPLE 3

The solution A (organic solvent solution) as shown in Table 8 is applied to a soft sheet of ABS resin prepared by calender molding (crash pad sheet) to form a coating film of the solution A. Then, the solution B (organic solvent solution) as shown in Table 8 is further applied thereto, and crosslinking under heating is effected to form a coating film of the solution B. The resultant sheet is placed into a frame for shaping, and urethane is introduced therein. The thus obtained foamed urethane composite is subjected to the thermal aging-resistance test. The results are shown in Table 9.

TABLE 8

| Run No. | 22 | 23 | 24 | 25 | 26 | 27 | 28 | 29 | 30 | 31 |
|---|---|---|---|---|---|---|---|---|---|---|
| Solution A (amount applied (solid components), g/m$^2$) | | | | | | | | | | |
| (A-1) Flexible urethane resin*[1] | 12 | 12 | 12 | — | 12 | 12 | — | 12 | — | 12 |
| (A-2) Methyl methacrylate-N,N-dimethylaminoethyl methacrylate copolymer*[2] | 3 | 3 | 3 | 3 | 3 | 3 | — | 3 | — | — |
| (A-2) Ethyl acrylate-N,N-dimethylaminoethyl methacrylate copolymer*[3] | — | — | — | — | — | — | — | — | — | 3 |
| Solution B (amount applied (solid components), g/m$^2$) | | | | | | | | | | |
| (B-1) MAA-BA copolymer*[4] | 4 | — | — | — | — | — | — | — | — | 4 |
| (B-1) AA-MMA copolymer*[5] | — | 4 | 4 | — | — | — | — | — | — | — |
| (B-1) AA-BA copolymer*[6] | — | — | — | — | — | 4 | — | — | — | — |
| (B-1) MAA-EA copolymer*[7] | — | — | — | 4 | — | — | — | — | — | — |
| (B-1) MAA-AA-BA copolymer*[8] | — | — | — | — | — | — | — | 4 | — | — |
| (B-2) ε-Caprolactam-blocked TDI | 2 | — | — | — | — | — | — | — | — | 2 |
| (B-2) Diglycidyl ether | — | 2 | — | — | — | — | — | — | — | — |
| (B-2) Bisphenol A diglycidyl ether | — | — | — | 2 | 2 | — | 2 | — | — | — |

TABLE 8-continued

| Run No. | 22 | 23 | 24 | 25 | 26 | 27 | 28 | 29 | 30 | 31 |
|---|---|---|---|---|---|---|---|---|---|---|
| (B-2) N-Methoxymethylated nylon | — | — | 2 | — | — | — | — | — | — | — |

Note:
*[1]"Nipporan 5104" manufactured by Nippon Polyurethane Co., Ltd.
*[2]Copolymer comprising methyl methacrylate and N,N-dimethylaminoethyl methacrylate in a weight proportion of 70:30.
*[3]Copolymer comprising ethyl acrylate and N,N-dimethylaminoethyl methacrylate in a weight proportion of 70:30.
*[4]Copolymer comprising methacrylic acid and butyl acrylate in a weight proportion of 40:60.
*[5]Copolymer comprising acrylic acid and methyl methacrylate in a weight proportion of 40:60.
*[6]Copolymer comprising acrylic acid and butyl acrylate in a weight proportion of 40:60.
*[7]Copolymer comprising methacrylic acid and ethyl acrylate in a weight proportion of 40:60.
*[8]Copolymer comprising methacrylic acid, acrylic acid and butyl acrylate in a weight proportion of 10:30:60.
In Run No. 31, the solution A is an aqueous emulsion.

TABLE 9

| Run No. | 22 | 23 | 24 | 25 | 26 | 27 | 28 | 29 | 30 | 31 |
|---|---|---|---|---|---|---|---|---|---|---|
| Elongation of covering material after thermal aging (%) | | | | | | | | | | |
| 100° C., 600 hours | 155 | 150 | 160 | 45 | 15 | <10 | 40 | <10 | <10 | 150 |
| 125° C., 350 hours | 30 | 90 | 105 | 30 | <10 | <10 | 20 | <10 | <10 | 80 |
| Adherence between foamed urethane and covering material after thermal aging | | | | | | | | | | |
| o - good adherence | | | | | | | | | | |
| x - bad adherence | o | o | o | o | o | x | x | o | o | o |
| Bending, cracking of foamed urethane composite after thermal aging (100° C., 600 hours) | | | | | | | | | | |
| o - no cracking | | | | | | | | | | |
| x - cracking being observed | o | o | o | x | x | x | x | x | x | o |

What is claimed is:

1. A foamed urethane composite which is prepared by
  (1) coating a covering material with
    (A) an organic solvent solution or aqueous emulsion comprising
      (A-1) at least one member selected from the group consisting of flexible urethane resins, starting materials for the preparation of flexible urethane resins, and vinyl chloride resins, and then with
    (B) an organic solvent solution comprising
      (B-1) a copolymer of one or more carboxyl group containing ethylenically unsaturated monomers and one or more monomers selected from the group consisting of acrylic and methacrylic esters and
      (B-2) at least one member selected from the group consisting of blocked isocyanate compounds, poly-N-alkoxymethylmalamine compounds, polyepoxy compounds, polyoxazoline compounds, polydihydrooxazine compounds and reactive polyamide compounds,
  (2) subjecting the coated covering material to crosslinking under heating, and
  (3) contacting the coated covering material with a foamed urethane compound.

2. A foamed urethane composite which is prepared by
  (1) coating a covering material with
    (A) an organic solvent solution or aqueous emulsion comprising
      (A-1) at least one member selected from the group consisting of flexible urethane resins, starting materials for the preparation of flexible urethane resins, and vinyl chloride resins, and then with
    (B) an organic solvent solution comprising
      (B-1) a copolymer of one or more carboxyl group containing ethylenically unsaturated monomers and one or more monomers selected from the group consisting of acrylic and methacrylic esters and
      (B-2) at least one member selected from the group consisting of blocked isocyanate compounds, poly-N-alkoxymethylmelamine compounds, polyepoxy compounds, polyoxazoline compounds, polydihydrooxazine compounds and reactive polyamide compounds,
  (2) contacting the coated covering material with a foamed urethane compound, and
  (3) heating the coated covering material and foamed urethane.

3. The foamed urethane composite according to claims 1 or 2, wherein the solution or emulsion (A) additionally contains (A-2) a copolymer comprising at least one ethylenically unsaturated monomer and an aminoalkyl acrylate compound of the formula:

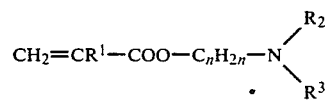

wherein $R^1$ is a hydrogen atom or a methyl group, $R^2$ and $R^3$ are each a hydrogen atom or a $C_1$–$C_4$ alkyl group and n is an integer of 1 to 4.

* * * * *